Patented Oct. 9, 1934

1,976,185

UNITED STATES PATENT OFFICE 1,976,185

WATER-INSOLUBLE AZO-DYESTUFFS AND FIBER DYED THEREWITH

Carl Josef Müller and Werner Kirst, Frankfort-on-the-Main, Germany, assignors to General Aniline Works, Inc., New York, N. Y., a corporation of Delaware No Drawing. Application October 5, 1931, Serial No. 567,131. In Germany October 6, 1930

14 Claims. (Cl. 260—76)

The present invention relates to new water-insoluble azo-dyestuffs and to fiber dyed therewith, more particularly it relates to green water-insoluble azo-dyestuffs which are obtainable by combining a diazo-compound of 7,7'-diaminothioindigo and its substitution products with an acetyl-acetic-acid-arylide or an aroyl-acetic-acid-arylide.

We have found that green azo-dyestuffs are obtainable by combining the above diazo-compounds of the indigoid vat-dyestuff with the said coupling components which latter may be designated as "yellow components". The dyestuffs represent a new class of azo-dyestuffs, they may be produced in substance, on the fiber or on any of the usual substrata which are adapted for the production of lakes. The shades of the dyestuffs vary from green to olive-green according to the coupling components used. Various substituted or unsubstituted acetyl-acetic-acid-arylides, such as, for instance, diacetoacetyl-ortho-tolidine, acetoacetyl-para-amidophenylbenzimidazole, furthermore, benzoyl-acetic-acid-arylides, dibenzoyl-acetic-acid-arylides, terephthaloyl-bis-acetic-acid-arylides and their substitution products, may be used.

The new water-insoluble azo-dyestuffs obtainable from diazotized 7,7'-diaminothioindigo surpass with regard to their fastness to washing and to soaping the green sulfur-dyestuffs and are distinguished by great tinctorial power.

The dyestuffs obtained by the present invention are characterized by the following probable general formula:

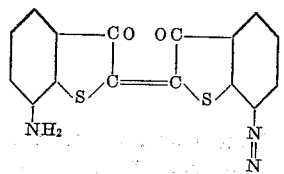

R—CO—CH—CO—NH—R₁—X wherein R represents alkyl or a radical of the benzene or naphthalene series, R₁ represents a radical of the benzene or naphthalene series and X stands for hydrogen or the radical of the following formula:

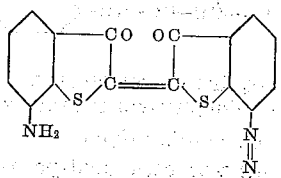

R₁—NH—CO—CH—CO—R wherein R and R₁ have the above indicated meaning, the radicals, however, being free from groups which would make the dyestuffs soluble in water.

The present invention is illustrated by a number of examples; it is pointed out, however, that the combinations mentioned in these examples and the several components used for their preparation only serve as illustrations and that the invention is not limited to the examples contained in this specification. As regards the components designated as "yellow components" and used for coupling with the diazo compounds of 7,7'-diaminothioindigo, the invention, likewise, is not restricted to the particular components mentioned in the following examples.

The following examples serve to illustrate the invention.

(1) Green dyeing on cotton from acetoacetyl-para-aminophenyl-benzimidazole and 7,7'-diaminothioindigo.

The fiber is impregnated with the following grounding liquor, well hydroextracted or squeezed and dyed in the diazo solution. The material is then rinsed well and soaped at the boil.

(a) *Grounding liquor*

5 grams of acetoacetyl-para-aminophenylbenzimidazole are dissolved with 10 cc. of Turkey red oil of 50% strength, 10 cc. of caustic soda solution of 34° Bé. and 28 grams of sodium sulfate. This solution is made up with water to 1 liter.

(b) *Diazo solution*

1.63 grams of 7,7'-diaminothioindigo are diazotized with 4 cc. of hydrochloric acid of 20° Bé. and 1 gram of sodium nitrite, dissolved in water. (Diazotization temperature 20° C. to 30° C.)

Thereupon 6 grams of sodium acetate, 1 cc. of acetic acid of 98% strength and 25 grams of sodium chloride are added. The whole is made up with water to 1 liter. (Dyeing temperature 30° C. to 40° C.)

A vivid green dyeing of good fastness to soaping is obtained.

The dyestuff has the following probable formula:

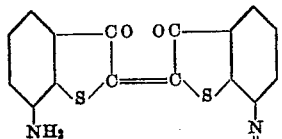

(2) Olivegreen dyeing on cotton from benzoyl-acetic-acid-para-amidophenylbenzimidazole.

(a) *Grounding liquor*

5 grams of benzoylacetic-acid-para-amidophenylbenzimidazole are dissolved with 10 cc. of Turkey red oil of 50% strength, 15 cc. of caustic soda solution of 34° Bé. and 28 grams of sodium sulfate. This solution is made up with water to 1 liter.

(b) *Diazo solution*

The diazo solution is prepared as in Example 1.

An olivegreen dyeing of good fastness to washing and to soaping is obtained.

The dyestuff has the following probable formula:

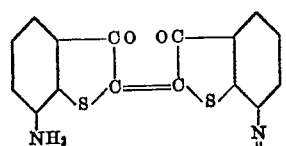

(3) Green dyeing on cotton from diacetoacetyl-ortho-tolidine and 7,7'-diaminothioindigo.

(a) *Grounding liquor*

3 grams of diacetoacetyl-ortho-tolidine are dissolved with 10 cc. of Turkey red oil of 50% strength, 10 cc. of caustic soda solution of 34° Bé. and 28 grams of sodium sulfate. This solution is made up with water to 1 liter.

(b) *Diazo solution*

The diazo solution is prepared as in Example 1.

A green dyeing of good fastness to washing and to soaping is obtained.

The dyestuff has the following probable formula:

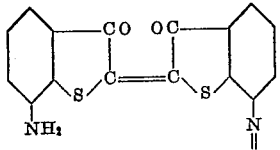
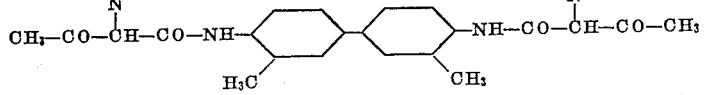

(4) By using in Example 1 instead of acetoacetyl-para-aminophenylbenzimidazole acetoacetyl-para-aminophenyl-4-methylbenzimidazole, a similar green dyeing is obtained.

The dyestuff has the following probable formula:

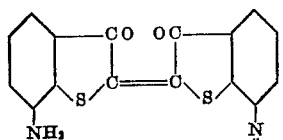

(5) 17.8 grams of diacetoacetyl-ortho-tolidine are dissolved in 60 cc. of caustic soda solution of 34° Bé. and 1 liter of water; thereupon, a diazo solution, prepared from 16.3 grams of 7.7'-diaminothioindigo, 40 cc. of hydrochloric acid of 20° Bé. and 10 grams of sodium nitrite, is added. An olivegreen dyestuff precipitates; after being filtered and dried, it forms a darkgreen powder dissolving in concentrated sulfuric acid with a green color. The dyestuff has the same probable formula as indicated in Example 3.

The following table indicates a number of green dyestuffs obtainable according to the present process but does not comprise all possibilities for the preparation of green to olive-green dyestuffs by using other coupling components, which components, however, must be free from groups which would render the dyestuffs soluble in water; it, therefore, is not intended to limit the invention to the dyestuffs mentioned therein:

| Diazotizing component: | Coupling component: |
|---|---|
| (1) 7,7'-diaminothioindigo | Benzoyl-acetic-acid-ortho-chloranilide |
| (2) 7,7'-diaminothioindigo | Para-methylbenzoyl-acetic-acid-alpha-naphthylamide |
| (3) 7,7'-diaminothioindigo | Para-methoxybenzoyl-acetic-acid-anilide |
| (4) 7,7'-diaminothioindigo | Meta-nitrobenzoyl-acetic-acid-ortho-chloranilide |
| (5) 7,7'-diaminothioindigo | Beta-naphthoyl-acetic-acid-anilide |
| (6) 7,7'-diaminothioindigo | Aceto-acetic-acid-2-methoxy-4-chloro-1-anilide |
| (7) 7,7'-diaminothioindigo | Terephthaloyl-bis-acetic-acid-4-chloro-2-methoxyanilide |
| (8) 7,7'-diaminothioindigo | Para-methylbenzoyl-acetic-acid-4-methoxy-1-anilide |
| (9) 7,7'-diaminothioindigo | Para-chlorobenzoyl-acetic-acid-anilide |
| (10) 7,7'-diaminothioindigo | Benzoyl-acetic-acid-ortho-toluidide |

Since an object of the present invention is to provide green water-insoluble azo-dyestuffs of good fastness properties and since the dyestuffs produced on the fiber must be fast to the action of alkalies, it is to be understood that the dyestuffs contain no substituents as are known to render organic compounds soluble in water or alkalies and to tend to depreciate the fastness of the dyestuffs to alkalies. Substituents of this kind are, for instance, the sulfonic acid and the carboxylic acid group. Such groups are not included within the scope of the appended claims.

We claim:
1. The water-insoluble azo-dyestuffs of the following general formula:

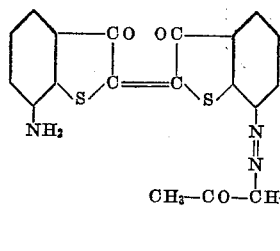

$$R-CO-CH-CO-NH-R_1-X$$

wherein R represents alkyl or a radical of the benzene or naphthalene series, $R_1$ represents a radical of the benzene or naphthalene series and X stands for hydrogen or the radical of the following formula:

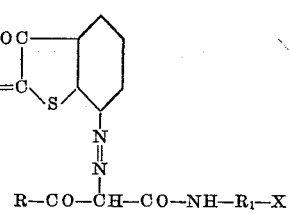

$$R_1-NH-CO-CH-CO-R$$

wherein R and $R_1$ have the above indicated meaning, dyeing green to olivegreen shades of good fastness properties.

2. The water-insoluble azo-dyestuffs of the following general formula:

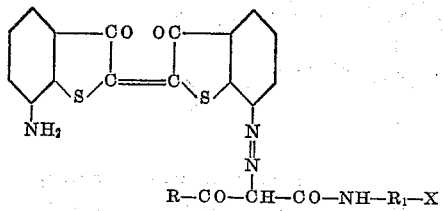

$$R-CO-CH-CO-NH-R_1-X$$

wherein R represents methyl or a radical of the benzene series which may be substituted by alkyl, alkoxy, halogen or the nitro group, $R_1$ represents a radical of the benzene series and X stands for hydrogen or the radical of the following formula:

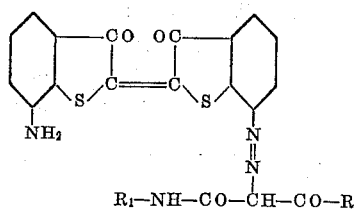

$$R_1-NH-CO-CH-CO-R$$

wherein R and $R_1$ have the above indicated meaning, dyeing green to olivegreen shades of good fastness properties.

3. The water-insoluble azo-dyestuff of the following formula:

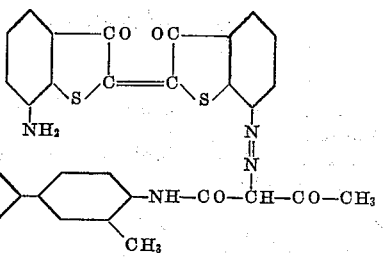

$$CH_3-CO-CH-CO-NH-\text{(biphenyl with } H_3C, CH_3\text{)}-NH-CO-CH-CO-CH_3$$

dyeing a green shade of good fastness to washing and to soaping.

4. The water-insoluble azo-dyestuffs of the following general formula:

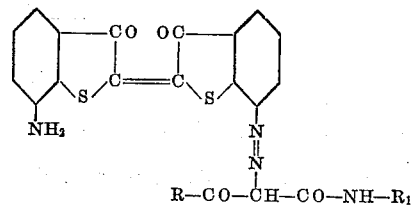

$$R-CO-CH-CO-NH-R_1$$

wherein R represents methyl or a radical of the benzene series which may be substituted by alkyl, alkoxy, halogen or the nitro group, $R_1$ represents a radical of the benzene series which may be substituted by alkyl, halogen, alkoxy or the radical of the following formula:

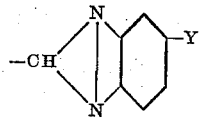

wherein Y represents hydrogen or alkyl, dyeing green to olivegreen shades of good fastness properties.

5. The water-insoluble azo-dyestuffs of the following general formula:

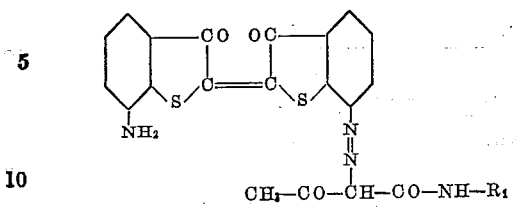

wherein $R_1$ represents a radical of the benzene series which may be substituted by alkyl, halogen, alkoxy or the radical of the following formula:

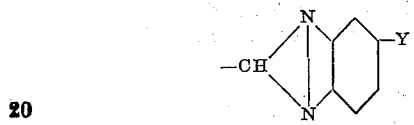

wherein Y represents hydrogen or methyl, dyeing green to olivegreen shades of good fastness properties.

6. The water-insoluble azo-dyestuff of the following formula:

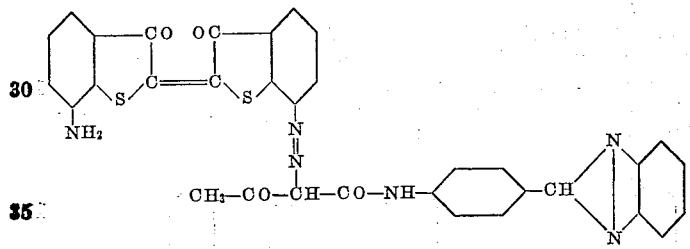

dyeing a vivid green shade of good fastness to soaping.

7. The water-insoluble azo-dyestuff of the following formula:

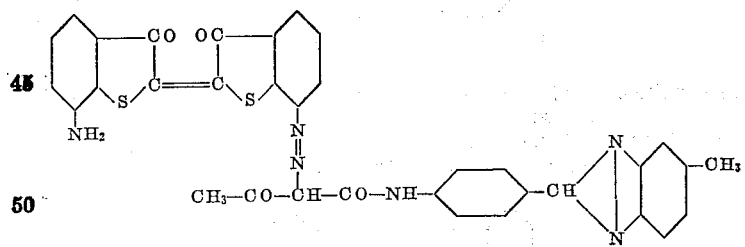

dyeing a vivid green shade of good fastness to soaping.

8. Fiber dyed with the dyestuffs as claimed in claim 1.

9. Fiber dyed with the dyestuffs as claimed in claim 2.

10. Fiber dyed with the dyestuff as claimed in claim 3.

11. Fiber dyed with the dyestuffs as claimed in claim 4.

12. Fiber dyed with the dyestuffs as claimed in claim 5.

13. Fiber dyed with the dyestuff as claimed in claim 6.

14. Fiber dyed with the dyestuff as claimed in claim 7.

CARL JOSEF MÜLLER.
WERNER KIRST.